United States Patent
Gladysz et al.

(10) Patent No.: US 8,058,321 B2
(45) Date of Patent: Nov. 15, 2011

(54) SYNTACTIC FOAM INCORPORATING VAPOR-GROWN CARBON FIBERS

(75) Inventors: Gary Gladysz, Sharon, MA (US); Kipp B Carlisle, Attleboro Falls, MA (US); Daniel Mendoza, Santa Fe, NM (US)

(73) Assignee: Trelleborg Offshore Boston, Inc., Mansfield, MA (US)

( * ) Notice: Subject to any disclaimer, the term of this patent is extended or adjusted under 35 U.S.C. 154(b) by 93 days.

(21) Appl. No.: 12/509,577

(22) Filed: Jul. 27, 2009

(65) Prior Publication Data
US 2011/0020630 A1   Jan. 27, 2011

(51) Int. Cl.
*C08J 9/00* (2006.01)
*B32B 3/26* (2006.01)

(52) U.S. Cl. ......... 521/76; 521/82; 521/182; 521/183; 521/184; 521/185; 977/724; 977/753

(58) Field of Classification Search ............ 521/76, 521/82, 83, 182, 183, 184, 185; 977/742, 977/753
See application file for complete search history.

(56) References Cited

U.S. PATENT DOCUMENTS

| | | | |
|---|---|---|---|
| 4,135,019 A | 1/1979 | Kourtides et al. | |
| 4,568,603 A | 2/1986 | Oldham | |
| 4,595,623 A | 6/1986 | DuPont et al. | |
| 4,671,994 A | 6/1987 | Cochran, Jr. | |
| 5,024,818 A | 6/1991 | Tibbetts et al. | |
| 5,433,906 A | 7/1995 | Dasch et al. | |
| 6,074,475 A | 6/2000 | Harrison et al. | |
| 6,455,606 B1 | 9/2002 | Kaku et al. | |
| 6,864,297 B2 | 3/2005 | Nutt et al. | |
| 7,553,371 B2 * | 6/2009 | Dubrow et al. | 117/90 |

OTHER PUBLICATIONS

W. B. Downs and R.T.K. Baker: Modification of the Surface Properties of Carbon Fibers via the Catalytic Growth of Carbon Nanofibers, J. Mater. Res., vol. 10, No. 3, Mar. 1995, pp. 625-633.

* cited by examiner

*Primary Examiner* — Irina S Zemel
(74) *Attorney, Agent, or Firm* — George A. Herbster

(57) ABSTRACT

Fibered particles combine microscale spheroid particles and nanoscale fibers in an integrated body. Fibered particles may be combined with a matrix precursor to form syntactic foams incorporating both particles and fibers.

18 Claims, 5 Drawing Sheets

US 8,058,321 B2

SYNTACTIC FOAM INCORPORATING VAPOR-GROWN CARBON FIBERS

BACKGROUND OF THE INVENTION

1. Field of the Invention

The invention pertains to making fibered microscale particles by growing nanoscale fibers onto microscale spheroid particles. Syntactic foams and methods for making syntactic foams incorporating fibered microscale particles are disclosed.

2. Background Information

Syntactic foams constitute a class of composite materials typically incorporating hollow particles known as microballoons in a matrix. Because of their relatively poor flexural and tensile properties, syntactic foams generally only perform well when used in simple compression. With exterior reinforcement, syntactic foams can be used in parts functioning under more complex loadings. One such application for syntactic foams is as the core material in laminate composites having fiber-reinforced skins. Such composites are used as lightweight structures in space applications.

Improving the flexural and tensile properties of syntactic foams could allow broader use of syntactic foam in applications with complex loadings. For example, a more mechanically versatile foam might be used in space structures with thinner reinforcing skins, resulting in a lower-density structure and more engineering design flexibility.

One approach to increasing flexural strength of syntactic foams has been to admix microscale fibers into the matrix. However, on the order of 20% of the microballoons in the foam are broken during the process of dispersing the fibers in the matrix. The microballoon breakage can reduce microballoon packing efficiency and significantly decrease the compressive strength of the foam.

There is, accordingly, a need to optimize the flexural properties of syntactic foams without compromising their compressive strength and/or density.

SUMMARY

In a first embodiment, a method of forming a syntactic foam comprises providing a plurality of particles, each of the plurality of particles having a size defined at an outer surface; growing a plurality of nanoscale fibers onto each of the outer surfaces to make respective fibered particles; providing a matrix precursor; and dispersing the fibered particles in the matrix precursor.

In another embodiment, a method of forming a syntactic foam comprises making a plurality of fibered carbon particles by providing a plurality of carbon particles, the plurality of carbon particles illustratively having respective outer surfaces and respective sizes having an average size value greater than 10 µm and less than about 2000 µm; creating metallic sites on the outer surfaces of the carbon particles, and exposing the metallic sites to a carbon-containing gas, thereby decomposing the gas to grow respective carbon fibers away from the outer surfaces of the carbon particles, the carbon fibers having an average diameter less than 50 nm; providing a thermosetting resin; dispersing the plurality of fibered carbon particles in the thermosetting resin; and curing the thermosetting resin.

In yet another embodiment, a syntactic foam comprises a matrix comprising a cured thermosetting resin; and a plurality of fibered carbon spheroids, constituting at least 40% of the syntactic foam by volume, dispersed in the matrix, each of the plurality of fibered carbon spheroids comprising: a carbon spheroid having a size defined at an outer surface and a plurality of carbon fibers, having an average diameter less than 50 nm, grown onto the outer surface, wherein the outer surfaces of the plurality of fibered carbon spheroids have an aggregate particle surface area and the plurality of fibered carbon spheroids have an average size of 10 to 120 µm.

In another embodiment, a fibered particle comprises a carbon spheroid having a size, between 10 µm and 120 µm, defined at an outer surface and a plurality of carbon fibers extending directly from the outer surface. Each of the fibers may have a diameter less than 50 nm, and the fibers may have a total surface area equal to at least fifteen times the area of the outer surface.

In another embodiment, a method of making a fibered particle comprises providing a carbon spheroid having a size, between 10 and 120 µm, defined at an outer surface; creating a plurality of metallic sites on the outer surface; and exposing the metallic sites to a gaseous hydrocarbon, thereby decomposing the hydrocarbon to grow respective carbon fibers from the metallic sites. The carbon fibers may have an average diameter less than 50 nm and the metallic sites may be such that the carbon fibers have a total fiber surface area equal to at least fifteen times the area of the outer surface.

BRIEF DESCRIPTION OF THE DRAWINGS

The invention description below refers to the accompanying drawing, of which.

Figure 1:
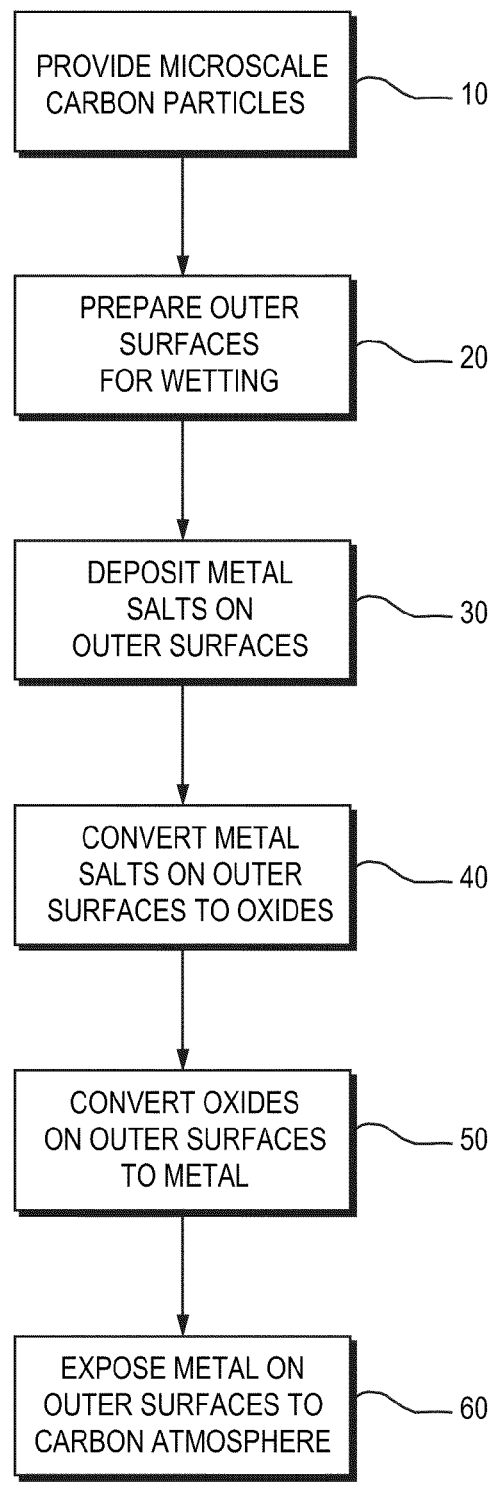
FIG. 1 is a flow diagram demonstrating an illustrative sequence of steps for making fibered carbon microballoons by growth of nanoscale carbon fibers onto a microballoon surface.

Features in the drawings are not, in general, drawn to scale.

DETAILED DESCRIPTION OF ILLUSTRATIVE EMBODIMENTS

Integration of nanoscale fibers and a microscale particle, particularly a spheroid particle, forms a fibered microscale particle. As used herein, "spheroid" includes not only strictly or approximately spherical bodies but also quasi-spheres such as ellipsoids. The fibered microscale spheroid particle comprises nanoscale fibers grown onto an outer surface of a microscale spheroid. As used herein to describe the relationship between nanoscale fibers and a particle, the terms "growing onto" and "grown onto" denote the process and result of building fibers directly on the exterior of the particle, which serves as a growth substrate, without any intermediate material, e.g., an adhesive. This relationship does not encompass simply adhering preexisting fibers onto the outer surface of the particle or incorporating fibers under the outer surface of the particle, such as within the wall of a hollow sphere. The fibers grown onto the particle extend directly away from the outer surface of the particle.

The fibered spheroid particle may be solid or hollow, such as a microballoon. Before fibers have been grown onto the outer surface of the spheroid particle to form the illustrative fibered microscale spheroid particle, the spheroid particle may be characterized by a size or outer dimension, such as a diameter or major axis, defined at the outer surface. The characteristic dimension may be less than about 200 micrometers (μm), for example less than about 150 μm, 120 μm, 100 μm, or 70 μm and greater than about 10 μm, 20 μm or 30 μm or, preferably between 10 μm and 120 μm. The spheroid particles may be of a carbon-containing material, e.g., a pyrolized phenolic.

The nanoscale fibers grown onto a sphere may have an average diameter less than, e.g., about 100 nm, 80 nm, 50 nm or 30 nm, or preferably between 25 and 35 nm. The nanoscale fibers may be carbon, either graphitic or amorphous in microstructure. The fibers grown onto the outer surface may have a total surface area equal to at least 15, 20, 30, or 50 times the area of the outer surface.

To fabricate an illustrative fibered spheroid particle, a spheroid particle is provided to serve as a growth substrate for nanoscale fibers. Preferably, the fibers are grown onto the outer surface of the spheroid at thousands or hundreds of thousands of fiber growth sites distributed over the growth substrate in a relatively uniform arrangement.

In one approach to distributing fiber growth sites over the growth substrate, a metal catalyst may be dispersed over the outer surface of the sphere in the form of a soluble metal-containing salt. As used herein, the term "metal-containing salt" means a salt having at least one ion bearing a metallic element. Subsequent treatment generates discrete catalytic particles, which may serve as growth sites for nanoscale fibers, from the dispersed salt. For example, the salt on the outer surface may be converted to metal particles by calcination and reduction. Then, upon heating in a gaseous atmosphere, the metal particles may catalyze the growth of nanoscale fibers onto the substrate at the distributed growth sites. A suitable technique is described in Downs and Baker, "Modification of the surface properties of carbon fibers via the catalytic growth of carbon nanofibers," J. Mater. Res., Vol. 10, No. 3, March 1995, which is hereby incorporated by reference in its entirety.

In particular, one procedure for growing carbon nanoscale fibers onto a plurality of carbon microscale spheroid particles begins with dispersing metal salts over the outer surfaces of the particles using an incipient wetness technique. In an incipient wetness technique, precursors to one or more constituents catalytic to carbon deposition—such as nickel, copper or both—are dissolved in a solvent. For example, water is capable of dissolving copper nitrate ($Cu(NO_3)_2$) and nickel nitrate ($Ni(NO_3)_2$) at respective concentrations corresponding to a Cu:Ni ratio falling in the range from 9:1 to 1:9, such as a metal weight ratio of 8:2, 7:3, 1:1, 3:7 or 2:8.

Preparatory to the outer surfaces' serving as a fiber growth substrate, an aqueous solution of copper and nickel nitrates is applied to the outer surfaces of the carbon microscale spheroid particles in a thin film in accordance with the incipient wetness technique, as known to those skilled in the art. The concentration of the catalyst precursors in the solution and the quantity of the solution applied to the substrate are chosen conjunctionally to provide a desired catalyst load on the growth substrate. For example, a desirable metal load may be in the range of 0.01% to 10%, such as a metal load of 0.05%, 1.0%, 2.5%, 5.0%, of the total weight of the spheroid particles. It is expected that for metal loads in this range the amount of carbon deposited will be proportional to the metal load.

A sequence of processing steps serves to eliminate the nitrate ions and ultimately converts the catalyst to metal particles containing both catalyst metals. For example, copper and nickel nitrates loaded onto a carbon particle can be converted to metal oxides by calcining at a moderate temperature, less than 500° C., in an oxygen-containing atmosphere. Then, the oxides can, be reduced to metal by heating in a reducing atmosphere such as a hydrogen-nitrogen or a hydrogen-helium mixture. The metal particles function as fiber growth sites on the outer surfaces of the spheroids.

The catalyst-bearing spheroid particles are then exposed to a carbon-containing gaseous atmosphere, such as by heating in the presence of a gaseous hydrocarbon, e.g., methane, ethane, ethylene, or acetylene. In the presence of hydrogen, the metal at the growth sites provokes decomposition of the carbon-containing gas with growth of carbon nanoscale fibers at the sites, creating fibered microscale spheroid particles. The carbon nanoscale fibers on the spheroid particle may be converted to silicon carbide by heating and exposing to a silicon-bearing gas such as silane. The reaction between carbon and silane to yield silicon carbide is known to those skilled in the art.

Syntactic foams may be formed by admixture of a plurality of fibered spheroid particles, up to about 1000 μm in size, such as fibered carbon microballoons, to a matrix precursor. Illustratively, the matrix precursor is a liquid or semi-liquid resin, particularly a thermosetting resin. Such thermosetting resins may be thereafter cured by chemical reaction, optionally aided by application of heat, pressure and/or irradiation, to form the matrix phase of the syntactic foam. The term "cure" as used herein means the formation of cross-links in the resin so as to form an insoluble and infusible product. The choice of matrix material is informed by, among other things, the physical properties of the resin before and after curing, as is known to those skilled in the art of syntactic foam fabrication.

Thermosetting resins compatible with the syntactic foam manufacture include, among others, epoxies, phenolics, polyesters, urea-formaldehydes, bismaleimides and polyimides. Curing temperatures for the assembled foams range roughly from room temperature and up, illustratively from 100° C. to 200° C., with curing times on the order of 30 minutes to 24 hours.

The matrix precursor generally contains a curing agent which promotes reaction of the resin to produce a hardened material and may also help tailor the physical properties. Optionally a curing accelerator enhances reaction kinetics and affords a desirable curing rate at lower temperatures. Other additives may include, e.g., diluents, wetting agents, stabilizing agents and other constituents, as is known to those skilled in the art.

The fibered particles, e.g., microballoons, may be dispersed in the matrix material by any one of several methods known to those skilled in the art of syntactic foam fabrication. For example, the fibered spheroid particles may be mixed mechanically with a matrix precursor to form a slurry or paste, which can be cast into a target shape before curing to produce the foam. Or, the fibered spheroid particles may be first combined with solid fusible resin particles which are then melted to form the matrix precursor around the particles.

In another approach, the fibered spheroid particles may be prepacked in a mold into which the matrix precursor is injected. The filled mold is held at appropriate temperature and pressure to effect curing of the matrix precursor in the mold.

Another approach exploits the tendency of hollow microscale carbon spheroid particles such as microballoons to rise to the upper surface of a liquid resin due to buoyant forces. Fibered spheroid particles may be introduced into a bath of moderately slow-curing liquid resin and dispersed by mechanical mixing. During the slow cure, the fibered spheroid particles float toward the upper surface, assembling relatively tightly packed layers of fibered spheroid particles in the matrix.

The fibered spheroid particles may constitute up to 70%, preferably between 35%, and 65% or between 40 and 60%, of the volume of the two-phase syntactic foam. Alternatively, the fibered spheroid particles and the matrix precursor are combined or thereafter manipulated so as to create interstitial void space serving as a third phase of the resulting syntactic foam.

The integration of spheroid particles such as microballoons and nanoscale fibers in the fibered particles affords easier dispersal of spheroid particles and fibers in a matrix material than mixing discrete particle and fiber phases. Mixing the fibered spheroid particles into the matrix material may break fewer particles compared with adding separate particle and fiber components. Correspondingly, flexural and tensile strength of the resulting syntactic foam may be enhanced by the fibers without a concomitant compromise in compressive strength.

Figure 2:
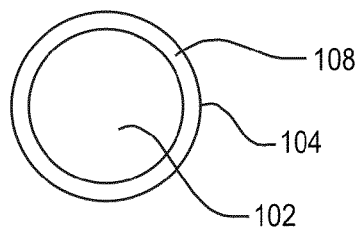
FIG. 2 is a cross-sectional representation of a carbon microballoon.
Figure 3:
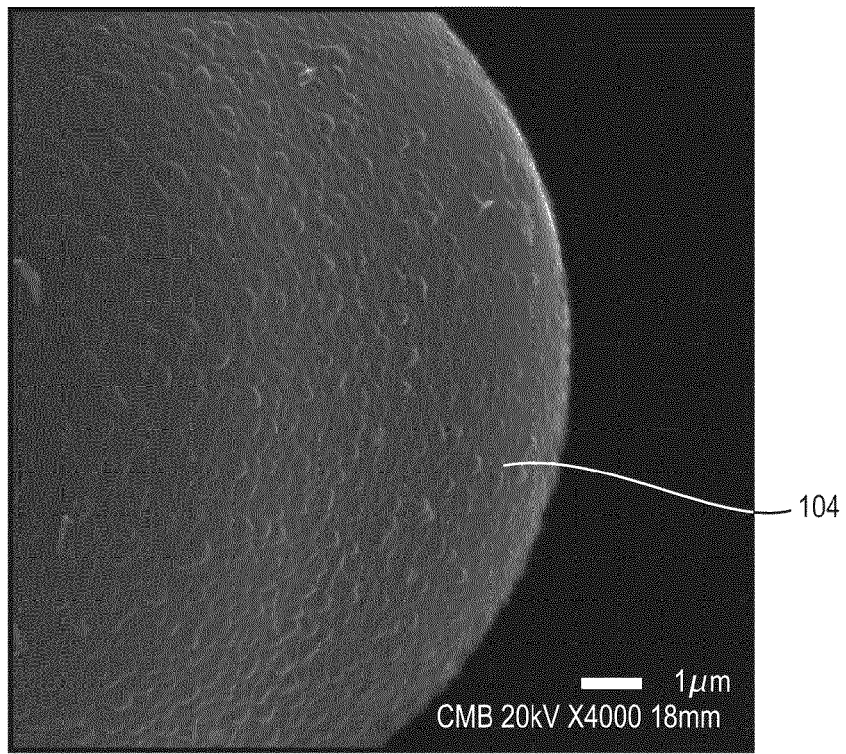
FIG. 3 is a scanning electron micrograph of a carbon microballoon.

FIG. 1 demonstrates steps in an exemplary process sequence used to prepare fibered microballoons. First, in step 10, a plurality of hollow carbon microscale spheres were provided. A representative hollow microscale sphere 102 as received, shown in the electron micrograph of FIG. 2, had an outer surface 104 with scattered relief features having typical dimensions of 200 nm or less. With reference to FIG. 3, the carbon microballoons 102 were up to 120 μm in diameter with a wall 108 having thicknesses in the range of 1 to 4 μm. The microballoons 102 had been prepared from phenolic resin microballoons by carbonization. Such carbonization may be accomplished by slow pyrolysis in an inert atmosphere, as is known to those skilled in the art. Suitable carbon microscale spheres may be prepared by converting phenolic spheres (available from Asia Pacific Microsphere). Such conversions are known to those skilled in the art. Converted microscale spheres are available from Trelleborg, Emerson and Cuming, Inc. (Mansfield, Mass.).

Figure 4:
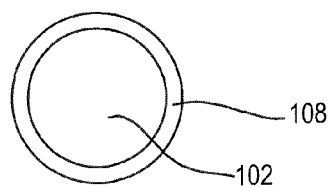
FIG. 4 is a cross-sectional view of a carbon microballoon in an oxidizing environment.

In step 20, the outer surfaces 104 of the hollow microscale spheres 102 were prepared for wetting by water. As represented in FIG. 4, the carbon microballoons 102 were treated in an oxidizing environment, an air plasma 115 operated at 0.8 Torr and 75 W for 15 minutes. The interaction of oxygen species in the plasma 115 with the carbon outer surface 104 in step 20 enhances the wettability of the outer surface 104 with respect to water.

Figure 5:
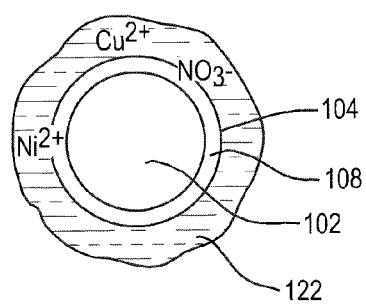
FIG. 5 is a cross-sectional view of a carbon microballoon covered by a thin film of nitrate solution.
Figure 6:
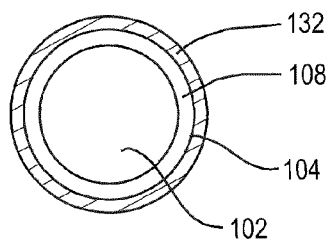
FIG. 6 is a cross-sectional view of a carbon microballoon covered by a thin layer of salts.

In step 30, a layer of copper and nickel nitrate was deposited onto the outer surfaces 104. Copper nitrate ($Cu(NO_3)_2$) and nickel nitrate ($Ni(NO_3)_2$) were first dissolved in water to establish a solution containing equal weights of copper and nickel. The solution was applied to the microballoons 102 in an amount sufficient to coat the outer surfaces 104 with a thin film 122 of the solution, as represented in FIG. 5. The total nitrate content of the applied thin film 122 corresponded to a final load of copper and nickel equal to about 5% of the weight of the microballoons 102 as received. The microballoons 102 coated with the thin film 122 were dried overnight at 110° C. in air 135 to remove the water, leaving a uniform layer 132 of copper and nickel salts, as represented in FIG. 6.

Figure 7:
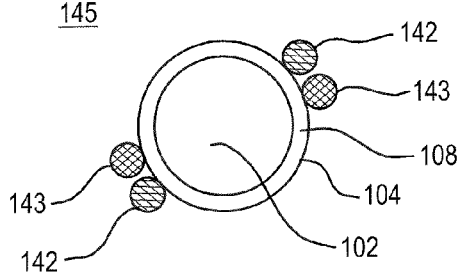
FIG. 7 is a cross-sectional view of a carbon microballoon with metal oxide particles on its outer surface.

In step 40, the layer 132 of copper and nickel salts was converted to oxide particles. First, with reference to FIG. 7, the microballoons 102 bearing the nitrate layer 132 were calcined at 300° C. for 30 minutes in an air atmosphere 145 in a tube furnace. The copper and nickel nitrates in the layer 132 on the outer surface 104 were thereby converted to particles of the respective oxides. The $CuO_x$ particle 142 and $NiO_x$ particle 143 represent the resulting dispersion of oxide particles over the outer surface 104.

Figure 8:
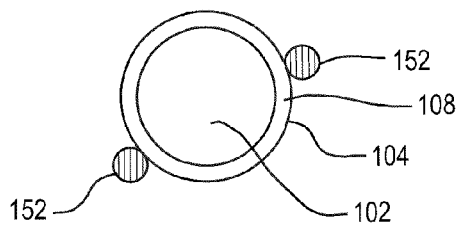
FIG. 8 is a cross-sectional view of a carbon microballoon with alloy particles on its outer surface.

In step 50, the oxide particles 142 and 143 on the outer surfaces 104 were converted to metal. The microballoons 102 bearing the oxide particles 142 and 143 were held at 600° C. in a 20% $H_2/N2$ atmosphere 155 for 30 minutes in the tube furnace. Reduction by hydrogen converted the oxide particles 142 and 143 to distributed copper-nickel alloy. In FIG. 8, copper-nickel particles 152 represent the resulting distribution of alloy particles.

Figure 9:
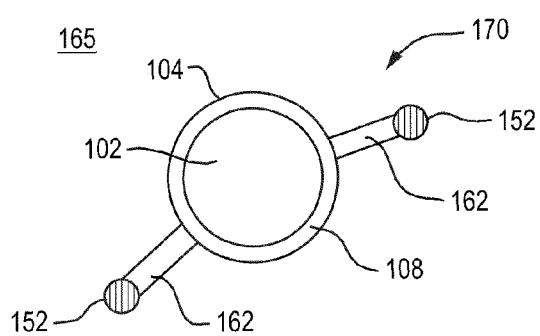
FIG. 9 is a cross-sectional view of a carbon microballoon with nanoscale carbon fibers grown on its outer surface to constitute a fibered carbon microballoon.

In step 60, the copper-nickel particles 152 were exposed to a carbon-bearing atmosphere. The microballoons 102 bearing alloy particles 152 were held at 600° C. in a 20% $H_2/C_2H_4$2 atmosphere 165 for 30 minutes in the tube furnace. In the presence of hydrogen, the copper-nickel alloy catalyzed decomposition of the ethylene, with ensuing growth of a respective carbon fiber 162 between the microballoon outer surface 104 and each alloy particle 152 as shown in FIG. 9.

Figure 10:
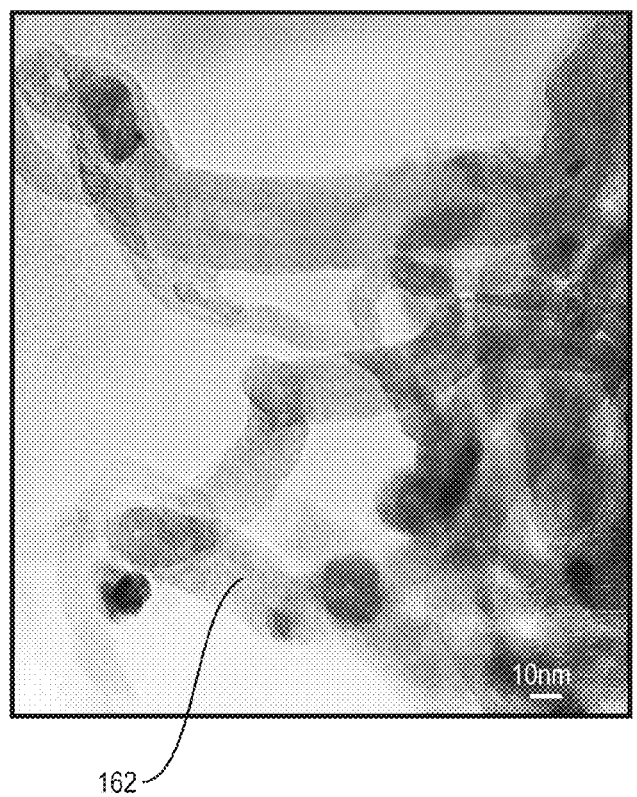
FIG. 10 is a transmission electron micrograph showing nanoscale carbon fibers grown onto a carbon microballoon.
Figure 11:
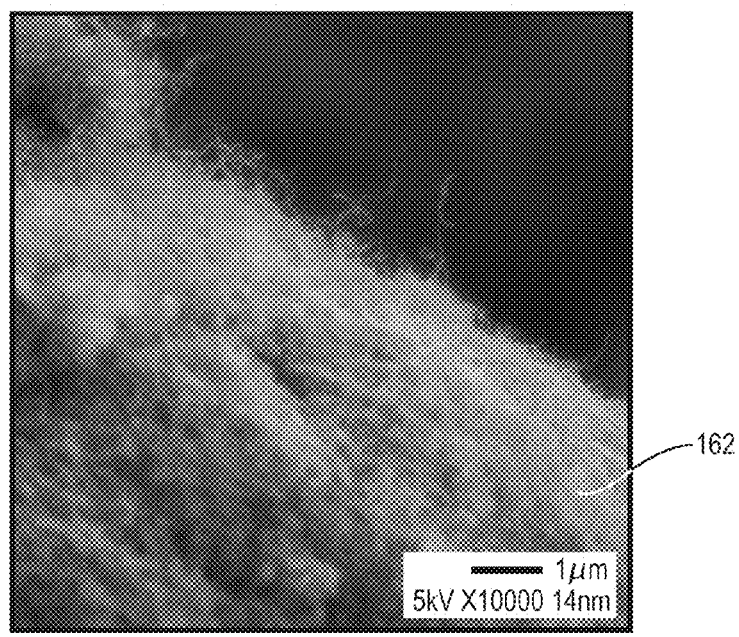
FIG. 11 is a scanning electron micrograph showing a fibered carbon microballoon made in accordance with the invention.

Transmission electron microscopy studies showed the diameters of the fibers 162 to be between 10 and 30 nm with very large aspect ratios, as shown in the micrograph of FIG. 10. It is estimated that the fibers on the resulting fibered microballoons 170 had an aggregate fiber surface area at least fifteen times the aggregate particle surface area of the outer surfaces 104, shown in FIG. 3, before fiber growth, of the plurality of microballoons 102, or greater than $60\pi r^2$ for an average radius r of the microballoons 102 as received. The average diameter of the fibered microballoons 170 was on the order of only 1 μm, or less than 2 μm, greater than the diameter measured on the outer surface 104 of the microballoon 102 as received, as shown in the electron micrograph of FIG. 11.

Figure 12:
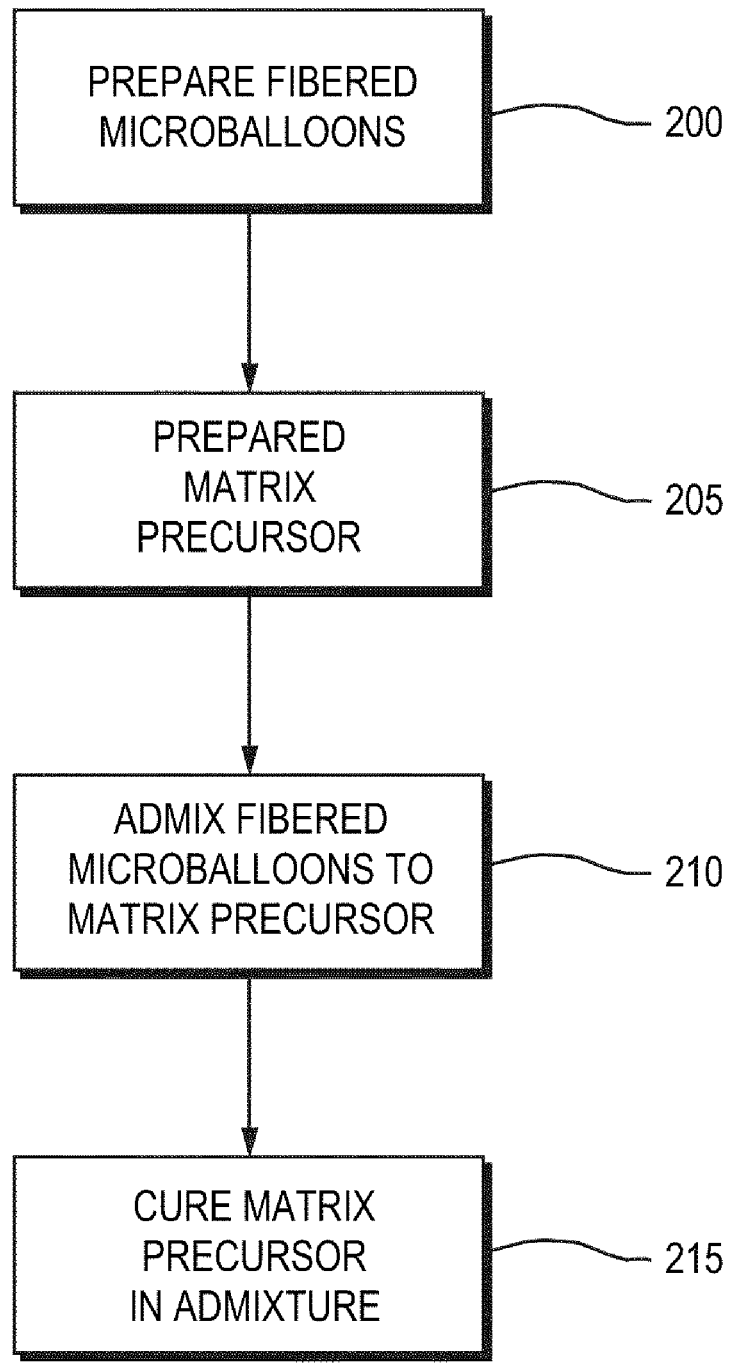
FIG. 12 is a flow diagram demonstrating a method of making a two-phase syntactic foam incorporating fibered microballoons.

FIG. 12 demonstrates an illustrative process for forming a syntactic foam having two phases, defined to be matrix material and the fibered carbon microballoons 162. In step 200, fibered microballoons are provided, e.g., prepared by the process sequence demonstrated in FIG. 1.

In step 205, a matrix precursor is provided in the form of a liquid comprising bismaleimide resin and a curing agent. The matrix precursor is prepared and maintained in a bath at 100° C.

In step 210, fibered microballoons 170 are admixed to the matrix precursor. The fibered microballoons are mechanically dispersed in the bath.

In step 215, the matrix precursor with the fibered microballoons admixed is cured. The bismaleimide resin cures over a period of 1 hour, during which buoyancy causes the fibered microballoons to migrate and pack together in higher concentration toward the upper surface of the bath.

After curing is complete, the bottom segregated resin layer may be sectioned and discarded. Fibered microballoons comprise about 50% by volume of the remaining syntactic foam, with cured bismaleimide forming the balance.

It will therefore be seen that the foregoing represents a highly advantageous approach to integrating microscale particles and nanoscale fibers, particularly for use in syntactic foam construction. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of forming a syntactic foam comprising:
providing a plurality of microballoons, each of the plurality of microballoons having an outer surface;
growing a plurality of nanoscale fibers onto each of the outer surfaces to make respective fibered microballoons;
providing a matrix precursor; and
dispersing the fibered microballoons in the matrix precursor.

2. The method of claim 1 wherein the plurality of the microballoons and the nanoscale fibers both contain carbon.

3. The method of claim 2 wherein the plain microballoons have an average outer radius between 5 and 60 μm.

4. The method of claim 2 wherein the nanoscale fibers have an average diameter between 25 and 35 nm.

5. The method of claim 2 wherein the matrix precursor is a thermosetting resin, the method further comprising curing the resin.

6. The method of claim 2 wherein the matrix precursor is a bismaleimide, the method further comprising curing the bismaleimide.

7. The method of claim 2 wherein the matrix precursor is provided at a concentration such that the fibered microballoons occupy a volume fraction of at least 40% of the syntactic foam.

8. The method of claim 2 wherein the microballoons have a total sphere surface area and the nanoscale fibers have a total fiber surface area equal to at least fifteen times the total plain microballoon surface area.

9. The method of 2 wherein the microballoons have an average outer radius r between 5 and 60 μm and the fibered microballoons have an average fibered radius less than r+2 μm.

10. A method of forming a syntactic foam comprising:
making a plurality of fibered carbon microballoons by
providing a plurality of carbon microballoons, the plurality of carbon microballoons having outer surfaces and an average outer radius r between 5 and 60 μm
creating metallic sites on the outer surfaces of the carbon microballoons, and
exposing the metallic sites to a carbon-containing gas, thereby decomposing the gas to grow respective carbon fibers away from the outer surfaces of the carbon microballoons, the carbon fibers having an average diameter less than 50 nm;
providing a thermosetting resin;
dispersing the plurality of fibered carbon microballoons in the thermosetting resin; and
curing the thermosetting resin.

11. The method of claim 10 wherein the number of metallic sites is such that the respective carbon fibers have a total surface area equal to at least $60\pi r^2$.

12. The method of claim 10 wherein the creating the metallic sites on the outer surfaces of the carbon microballoons comprises:
depositing at least one metal-containing salt on the outer surfaces of the carbon microballoons; and
converting the at least one metal-containing salt to metallic sites by heat treatment.

13. The method of claim 12 wherein the heat treatment comprises calcination.

14. The method of claim 13 wherein the heat treatment comprises reduction.

15. The method of claim 12 wherein depositing at least one metal-containing salt on each of the outer surfaces comprises:
dissolving the at least one metal-containing salt in a solvent to form a solution;
applying the solution to the outer surfaces of the carbon microballoons; and
evaporating the solvent.

16. The method of claim 15 wherein the exposing the metallic sites to a carbon-containing gas comprises providing ethylene to the metallic sites in the presence of hydrogen gas, the at least one metal-containing salt comprises copper and nickel salts, and the metallic sites comprise copper and nickel.

17. The method of claim 15 wherein the making the plurality of fibered carbon microballoons comprises exposing the respective outer surfaces to plasma, before applying the solution, to improve the wettability of the outer surfaces by the solvent.

18. The method of claim 10 wherein the exposing the metallic sites to the carbon-containing gas comprises providing ethylene to the metallic sites in the presence of hydrogen gas, the metallic sites comprising copper and nickel.

* * * * *